(12) United States Patent
Nagano et al.

(10) Patent No.: US 12,474,540 B2
(45) Date of Patent: Nov. 18, 2025

(54) DRIVING APPARATUS AND LENS APPARATUS HAVING THE SAME

(71) Applicant: CANON KABUSHIKI KAISHA, Tokyo (JP)

(72) Inventors: Toshimune Nagano, Saitama (JP); Yuichiro Kato, Tochigi (JP); Masayasu Mizushima, Tochigi (JP); Akino Moriyoshi, Tochigi (JP); Toru Matsumoto, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 435 days.

(21) Appl. No.: 18/306,329

(22) Filed: Apr. 25, 2023

(65) Prior Publication Data

US 2023/0367094 A1    Nov. 16, 2023

(30) Foreign Application Priority Data

May 11, 2022    (JP) .................................. 2022-078395

(51) Int. Cl.
*G02B 7/02*    (2021.01)
*G01D 5/347*    (2006.01)

(52) U.S. Cl.
CPC ......... *G02B 7/021* (2013.01); *G01D 5/34715* (2013.01)

(58) Field of Classification Search
CPC ......... G02B 27/646; G02B 7/04; G02B 7/021
See application file for complete search history.

(56) References Cited

U.S. PATENT DOCUMENTS

2018/0180899 A1*   6/2018   Nagaoka ............. G02B 27/646

FOREIGN PATENT DOCUMENTS

| JP | 2018-106071 A | 7/2018 |
| JP | 2018-180095 A | 11/2018 |
| JP | 2019-090952 A | 6/2019 |

* cited by examiner

*Primary Examiner* — Ephrem Z Mebrahtu
(74) *Attorney, Agent, or Firm* — Carter, DeLuca & Farrell LLP

(57) ABSTRACT

A driving apparatus includes a shift barrel, a first guide unit including a first rolling member, a second guide unit including a second rolling member, a first movable member movable in a first direction orthogonal to the optical axis direction movable in a second direction orthogonal to the optical axis direction and the first direction, a first driving unit configured to drive the first movable member in the first direction, a third guide unit including a third rolling member, a second movable member guided by the third guide unit so as to move in the second direction relative to the base and biased against the shift barrel via a fourth rolling member, a second driving unit configured to drive the second movable member in the second direction, and a biasing member biased in the optical axis direction. The first and third guide units include different members.

15 Claims, 6 Drawing Sheets

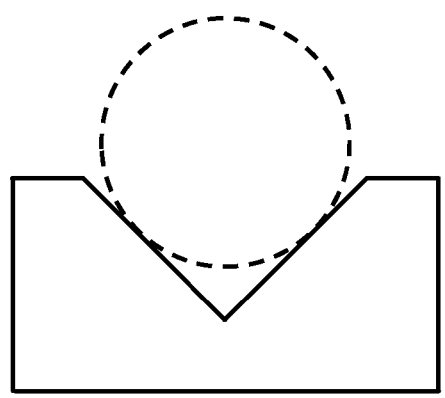 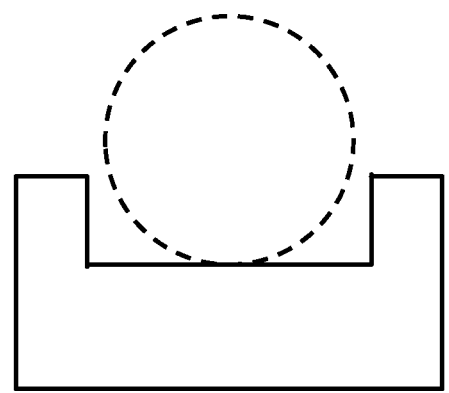
FIG. 3A  FIG. 3B
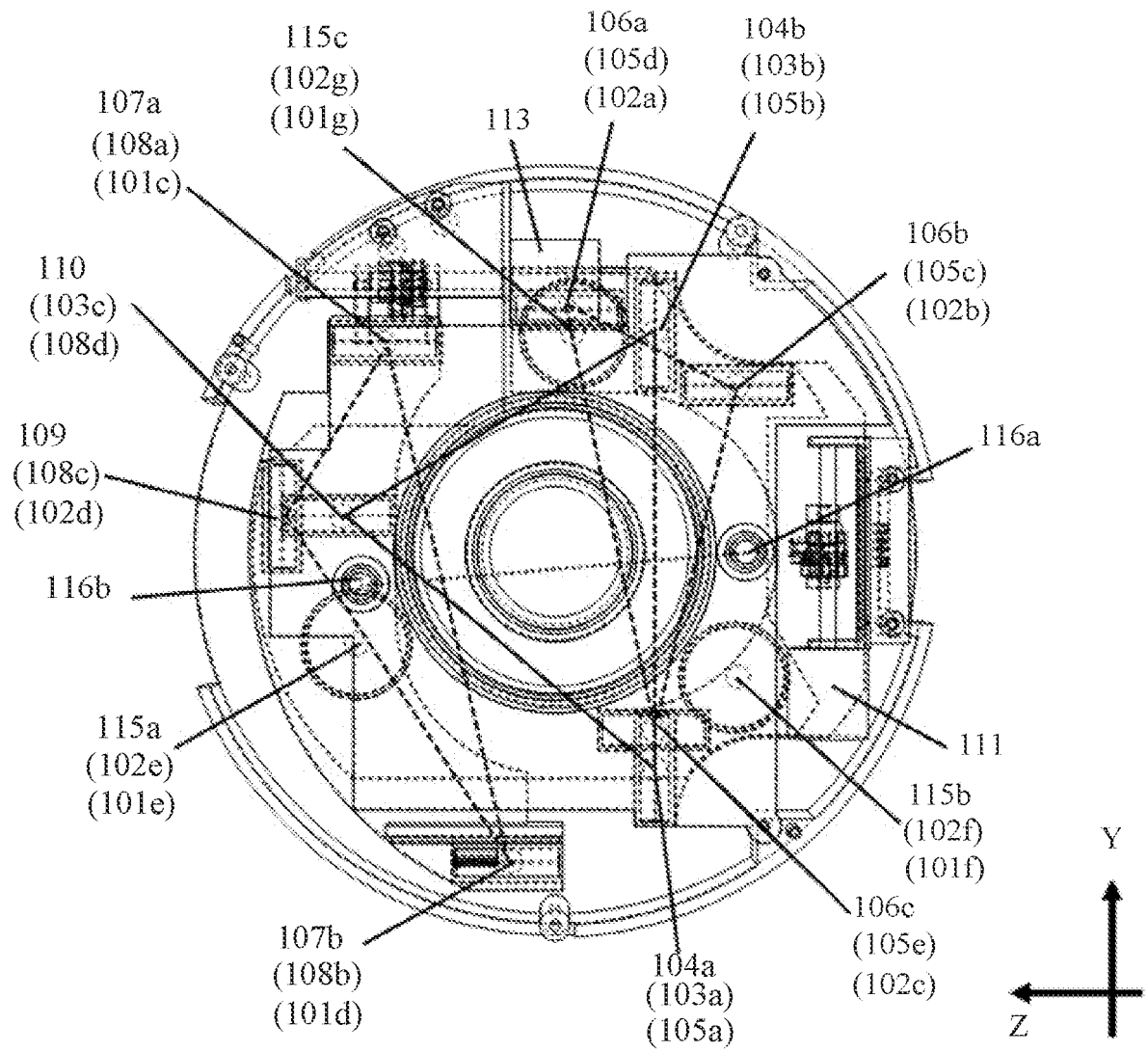
FIG. 4

DRIVING APPARATUS AND LENS APPARATUS HAVING THE SAME

BACKGROUND

Technical Field

One of the aspects of the disclosure relates to a driving apparatus and a lens apparatus having the same.

Description of Related Art

In order to acquire an image stabilizing effect, an image stabilizing mechanism has conventionally been known that moves an optical element unit in a direction orthogonal to an optical axis. An optical system has recently been proposed in which two optical element units are moved in the direction orthogonal to the optical axis for a tilt effect of tilting a focal plane and a shift effect of shifting the composition so that the tilted object plane can be fully focused (see Japanese Patent Laid-Open No. 2019-090952).

In a case where an optical system with the conventional image stabilizing mechanism is configured to obtain a sufficient tilt effect, a moving amount of the optical element unit becomes large. Thereby, the driving load may increase, the power consumption may increase, and the optical element unit may tilt.

SUMMARY

One of the aspects of the present disclosure provides a driving apparatus that can reduce a driving load and suppress tilt of an optical element unit even in a case where a moving amount of the optical element unit becomes large.

A driving apparatus according to one aspect of the disclosure includes a base, a shift barrel configured to hold a first optical member included in an optical system and held movably in a direction orthogonal to an optical axis direction parallel to an optical axis of the optical system, a first guide unit including a first rolling member, a second guide unit including a second rolling member, a first movable member guided by the first guide unit so as to move in a first direction orthogonal to the optical axis direction relative to the base and guided by the second guide unit so as to move in a second direction orthogonal to the optical axis direction and the first direction relative to the shift barrel, a first driving unit configured to drive the first movable member in the first direction, a third guide unit including a third rolling member, a second movable member guided by the third guide unit so as to move in the second direction relative to the base and biased against the shift barrel via a fourth rolling member, a second driving unit configured to drive the second movable member in the second direction, and a biasing member biased in the optical axis direction. The first guide unit and the third guide unit include different members. A lens apparatus including the above driving apparatus also constitutes another aspect of the disclosure.

Further features of the disclosure will become apparent from the following description of embodiments with reference to the attached drawings.

BRIEF DESCRIPTION OF THE DRAWINGS

FIGS. 3A and 3B illustrate a shape of a ball receiving portion.

FIG. 4 is a perspective view of the first shift unit viewed from an optical axis direction.

DESCRIPTION OF THE EMBODIMENTS

Figure 1:
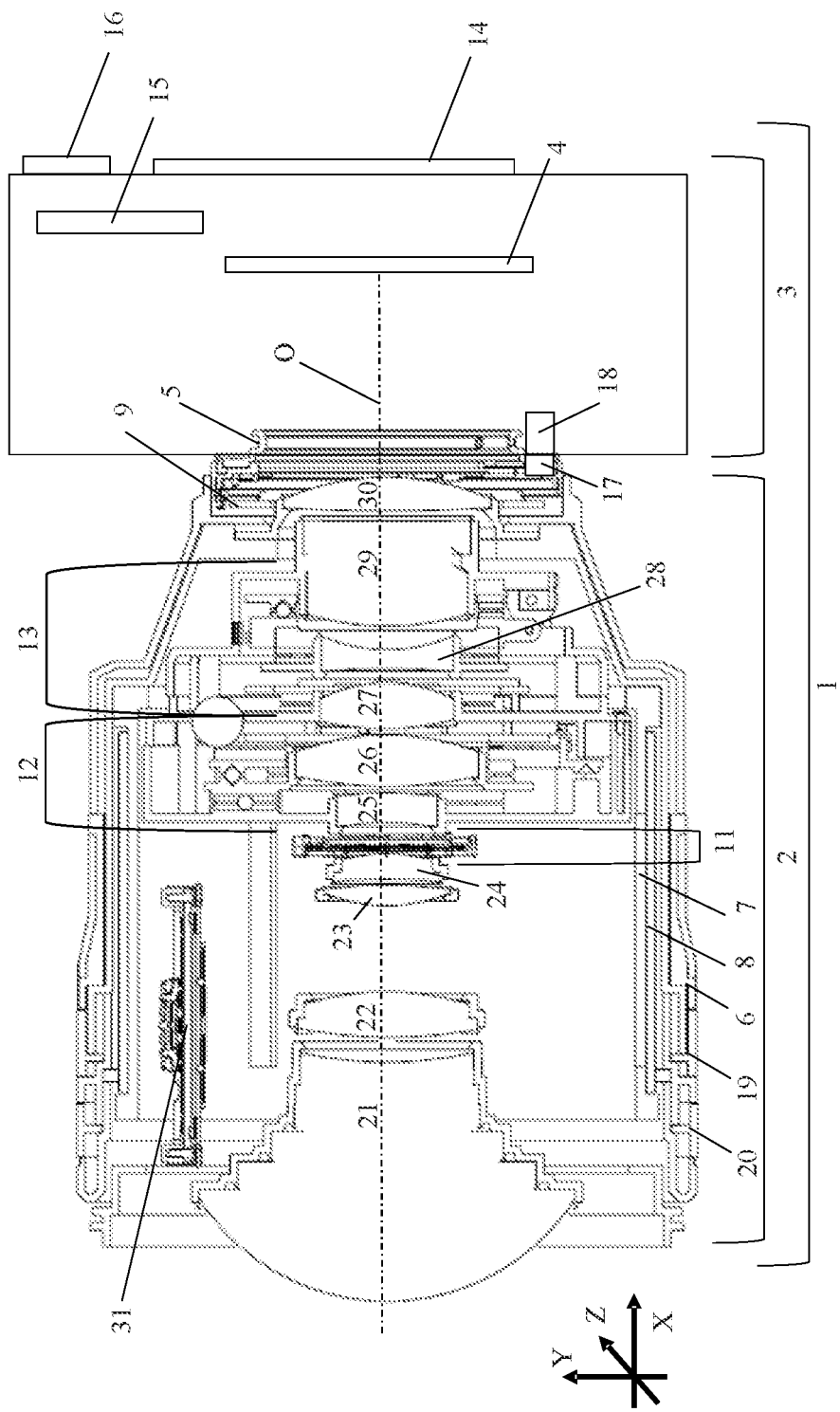
FIG. 1 is a sectional view of a camera system according to a first embodiment.

Referring now to the accompanying drawings, a detailed description will be given of embodiments according to the disclosure. Corresponding elements in respective figures will be designated by the same reference numerals, and a duplicate description thereof will be omitted.

First Embodiment

FIG. 1 is a sectional view of the camera system 1 according to this embodiment. The camera system 1 includes a lens barrel (lens apparatus) 2 and a camera (image pickup apparatus) 3. The lens barrel 2 and the camera 3 are connected via a mount 5 provided on the lens barrel 2 and an unillustrated mount provided on the camera 3, and communicate with each other via a lens-side communication unit 17 provided to the lens barrel 2 and a camera-side communication unit 18 provided to the camera 3. In this embodiment, a Y-axis direction is a vertical direction (gravity direction) in FIG. 1. An X-axis direction is a direction parallel to the optical axis O (optical axis direction) of the optical system included in the lens barrel 2. A Z-axis direction is a direction orthogonal to both the X-axis direction and the Y-axis direction.

The camera 3 includes an image sensor 4, a display unit 14, a camera-side CPU 15, and a viewfinder 16. Controlling an unillustrated shutter by the camera-side CPU 15 can expose and capture an image formed by the lens barrel 2 to the image sensor 4 for an arbitrary time. The display unit 14 displays the captured image and a setting screen for changing various settings of the camera system 1. In this embodiment, the display unit 14 includes a touch panel. Viewing the viewfinder 16, the photographer can confirm the captured image and input a visual line.

The lens barrel 2 includes an optical system, a zoom operation ring 6, a guide barrel 7, a cam barrel 8, a lens-side CPU 9, an aperture mechanism 11, a focus operation ring 19, and an aperture operation ring 20. The optical system includes a first lens unit 21, a second lens unit 22, a third lens unit 23, a fourth lens unit 24, a fifth lens unit 25, a sixth lens unit 26, a seventh lens unit 27, an eighth lens unit 28, a ninth lens unit 29, and a tenth lens unit 30. This embodiment can change at least one of the tilt effect of tilting the focal plane relative to the imaging plane of the image sensor 4 and the shift effect of moving the imaging range by moving at least one lens included in the optical system. Each lens is held by a corresponding barrel with cam followers. The cam followers are engaged with linear grooves parallel to the optical axis O provided in the guide barrel 7 and grooves that tilt relative to the optical axis O provided in the cam barrel 8. As the zoom operation ring 6 is rotated, the cam barrel 8 rotates and a positional relationship of each lens in the X-axis direction changes. Thereby, the focal length of the lens barrel 2 is changed. The focal length of the lens barrel 2 can be detected by an unillustrated zoom position detector that detects a rotating amount of the zoom operation ring 6. The lens-side CPU 9 changes an aperture diameter of the optical system by controlling the aperture mechanism 11. The photographer can specify the aperture diameter using the aperture operation ring 20, the display unit 14, and the like. In a case where the photographer does not specify the aperture diameter, the camera-side CPU 15 can automatically change the aperture diameter. The camera-side CPU 15 can control the exposure time and the sensitivity of the image sensor 4.

The second lens unit 22 is a focus unit that performs focusing by moving in the X-axis direction. The photographer can specify a focus position using the focus operation ring 19. The lens-side CPU 9 changes the focus position by controlling the second lens unit 22 via a vibration actuator 31 using a signal from an unillustrated detector that detects a rotating amount of the focus operation ring 19. The lens-side CPU 9 adjusts the focus position using a focal length obtained from the zoom position detector and at least one moving amount of the lens for changing at least one of the tilt effect and the shift effect.

This embodiment can change the tilt effect and the shift effect by moving the sixth lens unit 26 and the eighth lens unit 28 in the direction orthogonal to the optical axis O. More specifically, the tilt effect can be changed by moving the sixth lens unit 26 and the eighth lens unit 28 in opposite directions, and the shift effect can be changed by moving them in the same direction. The lens-side CPU 9 controls the sixth lens unit 26 via the driving unit using a signal from an unillustrated detector that detects a moving amount of the sixth lens unit 26. The lens-side CPU 9 controls the eighth lens unit 28 through the driving unit using a signal from an unillustrated detector that detects a moving amount of the eighth lens unit 28. The driving unit for moving each of the sixth lens unit 26 and the eighth lens unit 28 is, for example, a stepping motor or a voice coil motor (VCM). The tilt effect can be changed by tilting (rotating) the lens. The sixth lens unit 26 and the eighth lens unit 28 may be configured movable by the operation of the user on an unillustrated operation unit or the display unit 14. In this embodiment, a first shift unit 12 is a driving apparatus for moving the sixth lens unit 26 and a second shift unit 13 is a driving apparatus for moving the eighth lens unit 28.

Figure 2:
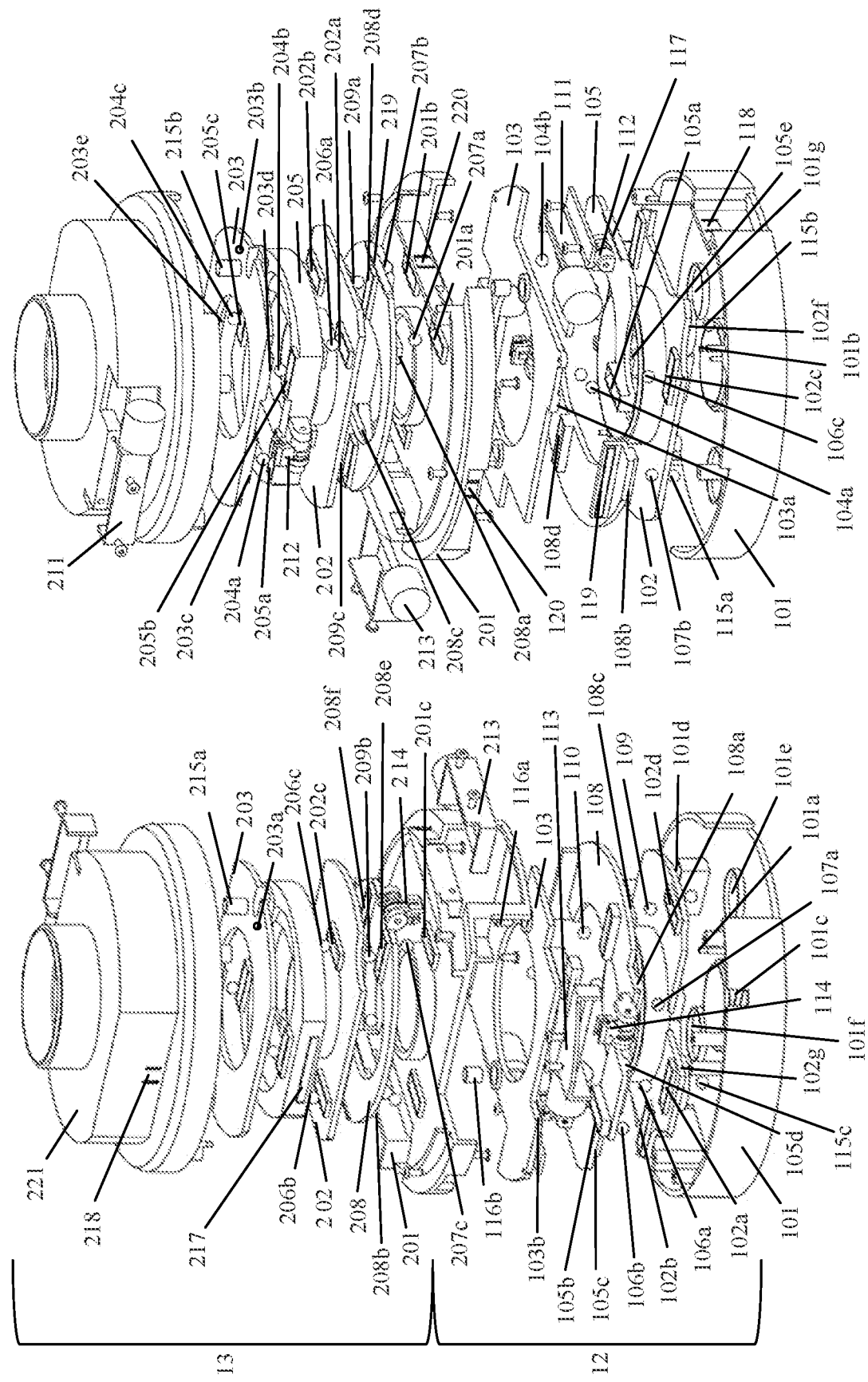
FIG. 2 is an exploded perspective view of a first shift unit and a second shift unit according to the first embodiment.
Figure 5:
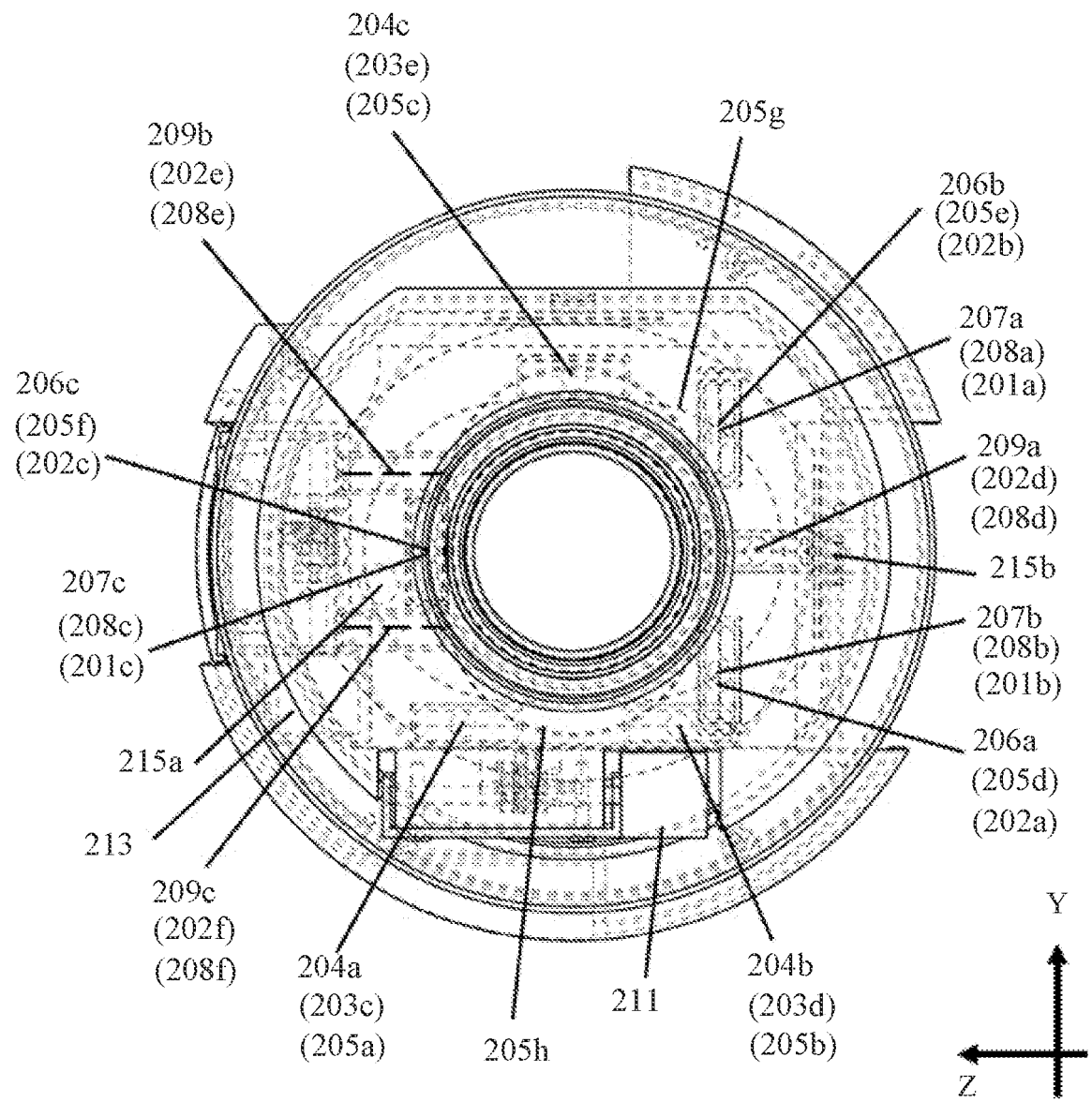
FIG. 5 is a perspective view of the second shift unit viewed from the optical axis direction.

FIG. 2 is an exploded perspective view of the first shift unit 12 and the second shift unit 13. FIGS. 3A and 3B explain a shape of a ball receiving portion, which will be described below. FIG. 4 is a perspective view of the first shift unit 12 viewed from the X-axis direction. FIG. 5 is a perspective view of the second shift unit 13 viewed from the X-axis direction.

The first shift unit 12 includes a base 101, a shift barrel 102, a biasing member 103, a first movable member 105, and a second movable member 108. The shift barrel 102 holds a sixth lens unit 26 (first optical member). The first movable member 105 and the second movable member 108 are disposed at the same position viewed from the optical axis O in the X-axis direction. The biasing member 103 has an annular shape when viewed from the X-axis direction. Each of the first movable member 105 and the second movable member 108 has a semicircular shape when viewed from the X-axis direction.

The first movable member 105 is movable in the Y-axis direction relative to the base 101 and is movable in the Z-axis direction relative to the shift barrel 102. The rotation of the shift barrel 102 about the optical axis O is suppressed by the first movable member 105. The second movable member 108 is movable in the Z-axis direction relative to the base 101 and in the Y-axis direction relative to the shift barrel 102. The first movable member 105 and the second movable member 108 are configured so as not to contact each other during moving.

The biasing member 103 is guided in the X-axis direction by positioning pins 101a and 101b provided to the base 101 and unillustrated positioning holes provided in the biasing member 103.

Compression springs 116a and 116b are disposed on the opposite side of the base 101 with respect to the biasing member 103 in the X-axis direction. The compression springs 116a and 116b are compressed by a base 201 screwed to the base 101 and the biasing member 103 and generate biasing forces. The shift barrel 102, the biasing member 103, the first movable member 105, and the second movable member 108 are biased against the base 101.

A stepping motor 111 is disposed on the opposite side of the base 101 with respect to the biasing member 103 in the X-axis direction, and moves the first movable member 105 in the Y-axis direction. A rack 112 is fixed to the first movable member 105 so that it can be equalized. The rack 112 is connected to the stepping motor 111 in the X-axis direction, and is biased against a lead screw of the stepping motor 111 by an unillustrated torsion spring. Although the rack 112 generates a biasing force in the Z-axis direction to the first movable member 105, it does not directly cause a driving load because it is guided. In this embodiment, the stepping motor 111 and the rack 112 constitute a first driving unit.

A stepping motor 113 is disposed on the opposite side of the base 101 with respect to the biasing member 103 in the X-axis direction, and moves the second movable member 108 in the Z-axis direction. A rack 114 is fixed to the second movable member 108 so that it can be equalized. The rack 114 is connected to the stepping motor 113 in the X-axis direction, and is biased against a lead screw of the stepping motor 113 by an unillustrated torsion spring. Although the rack 114 generates a biasing force in the Y-axis direction to the second movable member 108, it does not directly cause a driving load because it is guided. In this embodiment, the stepping motor 113 and the rack 114 constitute a second driving unit.

A first scale (scaler) 117 and a second scale (scaler) 119 are fixed to the first movable member 105 and the second movable member 108, respectively, and have scale patterns. An optical sensor 118 is fixed to the base 101 at a position facing the first scale 117. An optical sensor 120 is fixed to the base 201 at a position facing the second scale 119. The optical sensors 118 and 120 respectively detect the positions in the Y-axis direction and the Z-axis direction of the shift barrel 102 by reading reflected light reflected on the scale patterns. Thereby, the position of the shift barrel 102 on a plane orthogonal to the optical axis O can be detected.

The stepping motors 111 and 113 and the optical sensors 118 and 120 are connected to the lens-side CPU 9 by unillustrated flexible printed circuits, and a driving amount of each stepping motor can be controlled according to the detection result of each optical sensor.

This embodiment detects the positions using the scales and the optical sensors, but may detect the positions using photo-interrupters (PI) and resets or by counting the number of steps of each stepping motor.

The shift barrel 102 is biased against the base 101 via balls 115a, 115b, and 115c. The ball 115a is held by a ball receiving portion 101e of the base 101 and a ball receiving portion 102e of the shift barrel 102. The ball 115b is held by a ball receiving portion 101*f* of the base 101 and a ball receiving portion 102*f* of the shift barrel 102. The ball 115*c* is held by a ball receiving portion 101*g* of the base 101 and a ball receiving portion 102*g* of the shift barrel 102. Each ball receiving portion has a circular shape when viewed from the X-axis direction.

The first movable member 105 is biased against the shift barrel 102 via balls 106*a*, 106*b*, and 106*c*. The ball 106*a* is held by a ball receiving portion 102*a* of the shift barrel 102 and a ball receiving portion 105*d* of the first movable member 105. The ball 106*b* is held by a ball receiving portion 102*b* of the shift barrel 102 and a ball receiving portion 105*c* of the first movable member 105. The ball (sixth rolling member) 106*c* is held by a ball receiving portion 102*c* of the shift barrel 102 and a ball receiving portion 105*e* of the first movable member 105 of the first movable member 105.

The ball receiving portions 102*a*, 102*b*, 105*c*, and 105*d* extend in the Z-axis direction and have shapes illustrated in FIG. 3A when viewed from the Z-axis direction. The ball receiving portions 102*a* and 102*b* and the ball receiving portions 105*c* and 105*d* are spaced apart in the Z-axis direction. Therefore, the balls 106*a* and 106*b* (second rolling members) and the ball receiving portions 102*a*, 102*b*, 105*c*, and 105*d* constitute a guide unit (second guide unit) that guide the movement of the first movable member 105 in the Z-axis direction.

The ball receiving portion 105*e* extends in the Z-axis direction and has a shape illustrated in FIG. 3A when viewed from the Z-axis direction. The ball receiving portion 102*c* extends in the Z-axis direction and has a shape illustrated in FIG. 3B when viewed from the Z-axis direction. Therefore, the ball receiving portions 102*c* and 105*e* do not restrain the movement of the ball 106*c*.

The second movable member 108 is biased against the base 101 via balls 107*a* and 107*b*. The second movable member 108 is biased against the shift barrel 102 via a ball 109 (fourth rolling member). The ball 107*a* is held by a ball receiving portion 108*a* of the second movable member 108 and a ball receiving portion 101*c* of the base 101. The ball 107*b* is held by a ball receiving portion 108*b* of the second movable member 108 and a ball receiving portion 101*d* of the base 101. The ball 109 is held by a ball receiving portion 108*c* of the second movable member 108 and a ball receiving portion 102*d* of the shift barrel 102.

The ball receiving portions 101*c*, 101*d*, 108*a*, and 108*b* extend in the Z-axis direction and have shapes illustrated in FIG. 3A when viewed from the Z-axis direction. The ball receiving portions 108*a* and 108*b* and the ball receiving portions 101*c* and 101*d* are spaced apart in the Z-axis direction. Therefore, the balls 107*a* and 107*b* (third rolling members) and the ball receiving portions 101*c*, 101*d*, 108*a*, and 108*b* constitute a guide unit (third guide unit) that guides the movement of the second movable member 108 in the Z-axis direction.

The ball receiving portions 102*d* and 108*c* extend in the Y-axis direction and have shapes illustrated in FIG. 3A when viewed from the Y-axis direction. Therefore, in a case where the second movable member 108 moves in the Z-axis direction, the shift barrel 102 moves following the second movable member 108. In a case where the shift barrel 102 moves in the Y-axis direction, the second movable member 108 does not move.

The biasing member 103 is biased against the first movable member 105 via balls 104*a* and 104*b*. The biasing member 103 is biased against the second movable member 108 via a ball 110 (fifth rolling member). The ball 104*a* is held by a ball receiving portion 103*a* of the biasing member 103 and a ball receiving portion 105*a* of the first movable member 105. The ball 104*b* is held by a ball receiving portion 103*b* of the biasing member 103 and a ball receiving portion 105*b* of the first movable member 105. The ball 110 is held by a ball receiving portion 103*c* of the biasing member 103 and a ball receiving portion 108*d* of the second movable member.

The ball receiving portions 103*a*, 103*b*, 105*a*, and 105*b* extend in the Y-axis direction and have shapes illustrated in FIG. 3A when viewed from the Y-axis direction. The ball receiving portions 103*a* and 103*b* and the ball receiving portions 105*a* and 105*b* are spaced apart in the Y-axis direction. Therefore, the balls 104*a* and 104*b* (first rolling members) and the ball receiving portions 103*a*, 103*b*, 105*a*, and 105*b* constitute a guide unit (first guide unit) that guides the movement of the first movable member 105 in the Y-axis direction.

The ball receiving portion 103*c* extends in the Z-axis direction and has a shape illustrated in FIG. 3A when viewed from the Z-axis direction. The ball receiving portion 108*d* extends in the Z-axis direction and has a shape illustrated in FIG. 3B when viewed from the Z-axis direction. Therefore, the ball receiving portions 103*c* and 108*d* do not suppress the movement of the ball 110.

In this embodiment, the guide unit configured to guide the movement of the first movable member 105 in the Y-axis direction is formed between the biasing member 103 and the first movable member 105. The guide unit configured to guide the movement of the second movable member 108 in the Z-axis direction is formed between the base 101 and the second movable member 108. In the ball rolling configuration, at least two balls are necessary for one axis to form the guide unit. Four balls are required to configure the guide unit with different axes, but in a case where it is supported by the four balls, a play will occur in one of the balls. In this embodiment, the guide units for the movable members that move in different directions are configured by different members, so that at least one of the movable members is not located between the base and the shift barrel while the guide unit is supported by three balls. Thereby, the shift barrel 102 that holds the sixth lens unit 26 can be held on the base 101 via the ball, so that tilt fluctuations caused by driving can be suppressed. Since the sixth lens unit 26 can be held without a V-groove, tilt fluctuations can be easily suppressed in manufacturing.

When viewed from the X-axis direction, a midpoint of the compression springs 116*a* and 116*b* are located within a triangle formed by connecting the balls 104*a*, 104*b*, and 110. Thereby, the biasing forces of the compression springs 116*a* and 116*b* are distributed to the balls 104*a*, 104*b*, and 110 while the biasing member 103 is prevented from floating.

When viewed from the X-axis direction, the midpoint of the balls 104*a* and 104*b* is located within a triangle formed by connecting the balls 106*a*, 106*b* and 106*c*. Thereby, the first movable member 105 is prevented from floating, and the biasing forces transmitted from the balls 104*a* and 104*b* are distributed to the balls 106*a*, 106*b*, and 106*c*.

More specifically, the balls 104*a* and 104*b* are disposed opposite to each other with respect to the optical axis O in the Y-axis direction. That is, in the Y-axis direction, one of the balls 104*a* and 104*b* is disposed on a first side with respect to the optical axis O, and the other of the balls 104*a* and 104*b* is disposed on a second side opposite to the first side with respect to the optical axis O. During driving, the ball 104*a* has a region overlapping the ball 106*c*, and the ball 104*b* crosses a line connecting the balls 106*a* and 106*b*. That is, the balls 106a and 106b are located on one of the first and second sides, and the ball 106c is located on the other of the first and second sides. The stepping motor 111 is disposed outside the balls 106a and 106c in the Z-axis direction so as to partially overlap the ball 106b. The first scale 117 is disposed near the stepping motor 111. Due to this structure, the midpoint of the balls 104a and 104b is located within the triangle formed by connecting the balls 106a, 106b, and 106c even during driving. Even if a moving amount of the shift barrel 102 increases, each ball can be disposed without causing the lens barrel 2 to be larger.

When viewed from the X-axis direction, the ball 110 is located within a triangle formed by connecting the balls 107a, 107b, and 109. Thereby, the biasing force transmitted from the ball 110 is distributed to the balls 107a, 107b, and 109 while the second movable member 108 is prevented from floating.

More specifically, the balls 107a and 107b are disposed opposite to each other with respect to the optical axis O in the Y-axis direction. The ball 107a is disposed on the side of the ball 106a, and the ball 107b is disposed on the side of the ball 106c. The ball 107b overlaps the ball 106a in the Z-axis direction during driving. The ball 109 is disposed between the balls 107a and 107b in the Y-axis direction and on an outer diameter side of the ball 110 in the Z-axis direction, that is, distant from the optical axis O. The stepping motor 113 is disposed on the side of the ball 107a, and the second scale 119 is disposed on the side of the ball 107b. Due to this structure, the ball 110 is located within a triangle formed by connecting balls 107a, 107b, and 109. Even if a moving amount of the shift barrel 102 increases, each ball can be disposed without causing the lens barrel 2 to be larger.

The balls 115a, 115b, and 115c are provided approximately equally in the radial direction.

As described above, due to the above structure, the first shift unit 12 that includes a small number of components and is thin can be realized.

The biasing member 103 is divided into a first biasing member and a second biasing member. The first biasing member may bias the first movable member 105, and the second biasing member may bias the second movable member 108.

The second movable member 108 is guided by the balls 107a and 107b, but may be guided by the balls 107b and 110.

The second shift unit 13 includes a base 201, a shift barrel 202, a biasing member 203, a first movable member 205, and a second movable member 208. The shift barrel 202 holds the eighth lens unit 28 (first optical member). The biasing member 203 and the first movable member 205 are disposed adjacent to the eighth lens unit 28 in the X-axis direction, and overlaps the ninth lens unit 29 (second optical member) in the X-axis direction, which is held by a barrel 221 screwed to the base 201. The first movable member 205 overlaps the eighth lens unit 28 in the X-axis direction. Each of the biasing member 203, the first movable member 205, and the second movable member 208 has an annular shape when viewed from the X-axis direction.

The first movable member 205 is movable in the Z-axis direction relative to the base 201 and the barrel 221, and is movable in the Y-axis direction relative to the shift barrel 202. The rotation of the shift barrel 202 about the optical axis O is suppressed by the first movable member 205. The second movable member 208 is movable in the Y-axis direction relative to the base 201 and in the Z-axis direction relative to the shift barrel 202. The first movable member 205 and the second movable member 208 are configured so as not to contact each other during moving. In this embodiment, the first movable member 205 has an elongated hole 205g extending in the Z-axis direction in a region overlapping the eighth lens unit 28 in the X-axis direction, and has an elongated hole 205h extending in the Y-axis direction in a region overlapping the ninth lens unit 29 in the X-axis direction.

The biasing member 203 is guided in the X-axis direction by an unillustrated positioning pin provided to the barrel 221 and positioning holes 203a and 203b provided in the biasing member 203.

Compression springs 215a and 215b are disposed on the opposite side of the base 201 with respect to the biasing member 203 in the X-axis direction. The compression springs 215a and 215b are compressed by the barrel 221 and the biasing member 203 and generate biasing forces. The shift barrel 202, the biasing member 203, the first movable member 205, and the second movable member 208 are biased against the base 201.

A stepping motor 211 overlaps the biasing member 203 in the X-axis direction and moves the first movable member 205 in the Z-axis direction. A rack 212 is fixed to the first movable member 205 so that it can be equalized. The rack 212 is connected to the stepping motor 211 in the X-axis direction, and is biased against a lead screw of the stepping motor 211 by an unillustrated torsion spring. Although the rack 212 generates a biasing force in the Y-axis direction to the first movable member 205, it does not directly cause a driving load because it is guided. In this embodiment, the stepping motor 211 and the rack 212 constitute a first driving unit.

A stepping motor 213 is disposed on the opposite side of the shift barrel 202 with respect to the base 201 in the X-axis direction, and moves the second movable member 208 in the Y-axis direction. A rack 214 is fixed to the second movable member 208 so that it can be equalized. The rack 214 is connected to the stepping motor 213 in the X-axis direction, and is biased against a lead screw of the stepping motor 213 by an unillustrated torsion spring. Although the rack 214 generates a biasing force in the Z-axis direction to the second movable member 208, it does not directly cause a driving load because it is guided. In this embodiment, the stepping motor 213 and the rack 214 constitute a second driving unit.

A first scale (scaler) 217 and a second scale (scaler) 219 are fixed to the first movable member 205 and the second movable member 208, respectively, and have scale patterns. An optical sensor 218 is fixed to the barrel 221 at a position facing the first scale 217. An optical sensor 220 is fixed to the base 201 at a position facing the second scale 219. The optical sensors 218 and 220 respectively detect the positions in the Z-axis direction and the Y-axis direction of the shift barrel 202 by reading reflected light reflected on the scale patterns. Thereby, the position of the shift barrel 202 on a plane orthogonal to the optical axis O can be detected.

The stepping motors 211 and 213 and the optical sensors 218 and 220 are connected to the lens-side CPU 9 by unillustrated flexible printed circuits, and a driving amount of each stepping motor can be controlled according to the detection result of each optical sensor.

This embodiment detects the positions using the scales and the optical sensors, but may detect the positions using PI and resets or by counting the number of steps of each stepping motor.

The biasing member 203 biases the first movable member 205 via balls 204a, 204b, and 204c. The ball 204a is held by a ball receiving portion 203c of the biasing member 203 and a ball receiving portion 205a of the first movable member 205. The ball 204b is held by a ball receiving portion 203d of the biasing member 203 and a ball receiving portion 205b of the first movable member 205. The ball 204c is held by a ball receiving portion 203e of the biasing member 203 and a ball receiving portion 205c of the first movable member 205.

The ball receiving portions 203c, 203d, 205a, and 205b extend in the Z-axis direction and have shape illustrated in FIG. 3A when viewed from the Z-axis direction. The ball receiving portions 203c and 203d and the ball receiving portions 205a and 205b are spaced apart in the Z-axis direction. Therefore, the balls 204a and 204b (first rolling members) and the ball receiving portions 203c, 203d, 205a, and 205b constitute a guide unit (first guide member) that guide the movement of the first movable member 205 in the Z-axis direction.

The ball receiving portion 203e extends in the Z-axis direction and has a shape illustrated in FIG. 3A when viewed from the Z-axis direction, and the ball receiving portion 205c extends in the Z-axis direction and has a shape illustrated in FIG. 3B when viewed from the Z-axis direction. Therefore, the ball receiving portions 203e and 205c do not restrain the movement of the ball 204c.

The first movable member 205 is biased against the shift barrel 202 via balls 206a, 206b and 206c. The ball 206a is held by a ball receiving portion 205d of the first movable member 205 and a ball receiving portion 202a of the shift barrel 202. The ball 206b is held by a ball receiving portion 205e of the first movable member 205 and a ball receiving portion 202b of the shift barrel 202. The ball 206c is held by a ball receiving portion 205f of the first movable member 205 and a ball receiving portion 202c of the shift barrel 202.

The ball receiving portions 202a, 202b, 205d, and 205e extend in the Y-axis direction and have shapes illustrated in FIG. 3A when viewed from the Y-axis direction. The ball receiving portions 202a and 202b and the ball receiving portions 205d and 205e are spaced apart in the Y-axis direction. Therefore, the balls 206a and 206b (second rolling members) and the ball receiving portions 202a, 202b, 205d, and 205e constitute a guide unit (second guide unit) that guides the movement of the first movable member 205 in the Y-axis direction.

The ball receiving portion 202c extends in the Y-axis direction and has a shape illustrated in FIG. 3B when viewed from the Y-axis direction, and the ball receiving portion 205f extends in the Y-axis direction and has a shape illustrated in FIG. 3A when viewed from the Y-axis direction. Therefore, the ball receiving portions 202c and 205f do not restrain the movement of the ball 206c.

The shift barrel 202 is biased against the second movable member 208 via balls 209a, 209b, and 209c (fourth rolling members). The ball 209a is held by a ball receiving portion 202d of the shift barrel 202 and a ball receiving portion 208d of the second movable member 208. The ball 209b is held by a ball receiving portion 202e of the shift barrel 202 and a ball receiving portion 208e of the second movable member 208. The ball 209c is held by a ball receiving portion 202f of the shift barrel 202 and a ball receiving portion 208f of the second movable member 208.

The ball receiving portions 202d, 202e, 202f, and 208d extend in the Z-axis direction and have shapes illustrated in FIG. 3A when viewed from the Z-axis direction. The ball receiving portions 208e and 208f extend in the Z-axis direction and have shapes illustrated in FIG. 3B when viewed from the Z-axis direction. In a case where the second movable member 208 moves in the Y-axis direction, the shift barrel 202 moves following the second movable member 208. In a case where the shift barrel 202 moves in the Y-axis direction, the second movable member 208 does not move. The ball receiving portions 202e and 208e and the ball receiving portion 202f do not restrain the movements of the balls 209b and 209c, respectively.

The second movable member 208 is biased against the base 201 via balls 207a, 207b, and 207c. The ball 207a is held by a ball receiving portion 208a of the second movable member 208 and a ball receiving portion 201a of the base 201. The ball 207b is held by a ball receiving portion 208b of the second movable member 208 and a ball receiving portion 201b of the base 201. The ball 207c is held by a ball receiving portion 208c of the second movable member 208 and a ball receiving portion 201c of the base 201.

The ball receiving portions 201a, 201b, 208a, 208b, and 208c extend in the Y-axis direction and have shapes illustrated in FIG. 3A when viewed from the Y-axis direction. The ball receiving portions 201a, 201b, 208a, and 208b are spaced apart in the Y-axis direction. The ball receiving portions 201a, 201b, 208a, and 208b constitute a guide in the Y-axis direction between the base 201 and the second movable member 208. The balls 207a and 207b (third rolling members) and the ball receiving portions 201a, 201b, 208a, and 208b constitute a guide unit (third guide unit) that guide the movement of the second movable member 208 in the Y-axis direction.

The ball receiving portion 201c extends in the Y-axis direction and has a shape illustrated in FIG. 3B when viewed from the Y-axis direction, and the ball receiving portion 208c extends in the Y-axis direction and has a shape illustrated in FIG. 3A when viewed from the Y-axis direction. Therefore, the ball receiving portions 201c and 208c do not restrain the movement of the ball 207c.

In this embodiment, the guide unit that guides the movement of the first movable member 205 in the Z-axis direction is formed between the biasing member 203 and the first movable member 205. The guide unit that guides the movement of the second movable member 208 in the Z-axis direction is formed between the base 201 and the second movable member 208. In the ball rolling configuration, at least two balls are necessary for one axis to form the guide unit. Four balls are required to configure the guide unit with different axes, but in a case where it is supported by the four balls, a play will occur in one of the balls. In this embodiment, the guide units for the movable members that move in different directions are configured by different members, so that at least one of the movable members is not located between the base and the shift barrel while the guide unit is supported by three balls. Thereby, the shift barrel 202 that holds the eighth lens unit 28 can be held on the base 201 via the ball, so that tilt fluctuation caused by driving can be suppressed. Since the eighth lens unit 28 can be held without a V-groove, tilt fluctuations can be easily suppressed in manufacturing.

When viewed from the X-axis direction, a midpoints of the compression springs 215a and 215b is located within a triangle formed by connecting the balls 204a, 204b, and 204c. Thereby, the biasing forces of the compression springs 215a and 215b are distributed to the balls 204a, 204b, and 204c while the biasing member 203 is prevented from floating.

When viewed from the X-axis direction, a gravity center of the triangle formed by connecting the balls 204a, 204b, and 204c is located within a triangle formed by connecting the balls 206a, 206b, and 206c. Thereby, the biasing forces transmitted from the balls 204a, 204b and 204c are distributed to the balls 206a, 206b, and 206c while the first movable member 205 is prevented from floating.

More specifically, in the Y-axis direction, the ball 204c is disposed on the opposite side of the balls 204a and 204b with respect to the optical axis O. In the Z-axis direction, the ball 204a is disposed on the opposite side of the ball 204b with respect to the optical axis O. The balls 204a, 204b, and 204c overlap the ninth lens unit 29 in the X-axis direction. Since the ball receiving portions 205a and 205b extend in the Z-axis direction, the balls 204a and 204b can be disposed on an inner diameter side of the ball receiving portions 205a and 205b.

In the Z-axis direction, the ball 206c is disposed on the opposite side of the balls 206a and 206b with respect to the optical axis O. In the Y-axis direction, the ball 206a is disposed on the opposite side of the ball 206b with respect to the optical axis O. The balls 206a, 206b, and 206c overlap the eighth lens unit 28 in the X-axis direction. Since the ball receiving portions 205d and 205e extend in the Y-axis direction, the balls 206a and 206b can be disposed on an inner diameter side of the ball receiving portions 205d and 205e.

When viewed from the X-axis direction, the ball receiving portions 205d and 205e can be disposed in a region overlapping the elongated hole 205g. When viewed from the X-axis direction, the ball receiving portions 205a and 205b can be disposed in a region overlapping the elongated hole 205h. Thereby, the size of the first movable member 205 can be reduced in the radial direction, and the size of the second shift unit 13 can be reduced in the radial direction.

In the Y-axis direction, the stepping motor 211 is disposed outside the balls 204a and 204b. In the Y-axis direction, the first scale 217 is disposed outside the ball 204c.

Due to the above structure, the gravity center of the triangle formed by connecting the balls 204a, 204b, and 204c is located inside the triangle formed by connecting the balls 206a, 206b, and 206c even during driving. In addition, the above structure can realize efficient arrangement that can prevent the size from increasing even in a case where a driving amount becomes large. Moreover, the above structure can dispose each ball without causing the lens barrel 2 to be larger even in a case where a moving amount of the shift barrel 202 becomes large.

When viewed from the X-axis direction, the gravity center of the triangle formed by connecting the balls 206a, 206b, and 206c is located within the triangle formed by connecting the balls 209a, 209b, and 209c. Thereby, the biasing forces transmitted from the balls 206a, 206b, and 206c are distributed to the balls 209a, 209b, and 209c while the shift barrel 202 is prevented from floating.

More specifically, in the Z-axis direction, the ball 209a is disposed on the side of the balls 206a and 206b with respect to the optical axis O. The balls 209b and 209c are disposed on the side of the ball 206c with respect to the optical axis O. Thereby, the gravity center of the triangle formed by connecting the balls 206a, 206b, and 206c is located within the triangle formed by connecting the balls 209a, 209b, and 209c even during driving. Even in a case where the moving amount of the shift barrel 202 becomes large, this structure can dispose each ball without causing the lens barrel 2 to be larger.

When viewed from the X-axis direction, the balls 206a, 206b, 206c, 209a, 209b, and 209c can be disposed without overlapping each other during driving, and the size of the shift barrel 202 can be reduced in the X-axis direction. Even in a case where the moving amount of the shift barrel 202 becomes large, this structure can dispose each ball without causing the lens barrel 2 to be larger.

When viewed from the X-axis direction, the gravity center of the triangle formed by connecting the balls 209a, 209b, and 209c is located within the triangle formed by connecting the balls 207a, 207b, and 207c. Thereby, the biasing forces transmitted from the balls 209a, 209b, and 209c are distributed to the balls 207a, 207b, and 207c while the second movable member 208 is prevented from floating.

More specifically, when viewed from the X-axis direction, the balls 207a, 207b, and 207c overlap the balls 206a, 206b, and 206c. In the Z-axis direction, the stepping motor 213 is disposed outside the ball 207c. In the Z-axis direction, the second scale 219 is disposed outside the balls 207a and 207b. Thereby, the gravity center of the triangle formed by connecting the balls 209a, 209b, and 209c is located within the triangle formed by connecting the balls 207a, 207b, and 207c even during driving. In addition, even in a case where the moving amount of the shift barrel 202 becomes large, each ball can be disposed without causing the lens barrel 2 to be larger. Moreover, the size of the second movable member 208 can be reduced in the X-axis direction.

As described above, the configuration according to this embodiment can reduce the driving load and suppress tilt of the optical element unit even in a case where the driving amount of the optical element unit becomes large.

While the first shift unit 12 and the second shift unit 13 have different configurations in this embodiment, the disclosure is not limited to this embodiment. These two shift units may have the same structure (one of the structures described in this embodiment), or the first shift unit 12 may have the structure of the second shift unit 13 in this embodiment, and the second shift unit 13 may have the structure of the first shift unit 12 in this embodiment.

In this embodiment, the rotation of the shift barrel 202 is suppressed by the first movable member 205, but may be suppressed by the second movable member 208. More specifically, when viewed from the X-axis direction, the ball receiving portion 202b may have the shape illustrated in FIG. 3B, and the ball receiving portion 208e may have the shape illustrated in FIG. 3A.

In this embodiment, in the structure of the second shift unit 13, the first movable member 205 is disposed between the biasing member 203 the shift barrel 202 and the second movable member 208 is disposed between the shift barrel 202 and the base 201, but the disclosure is not so limited to this embodiment. One of the first movable member 205 and the second movable member 208 may be disposed between the shift barrel 202 and the biasing member 203 and the other disposed between the shift barrel 202 and the base 201.

Second Embodiment

The basic configuration of the camera system according to this embodiment is similar to that of the camera system of the first embodiment. This embodiment is different from the first embodiment in a structure of the shift unit. The structure of the shift unit according to this embodiment is applicable to both the first shift unit 12 and the second shift unit 13. This embodiment will discuss a configuration different from that of the first embodiment, and omit a description of the common configuration.

Figure 6:
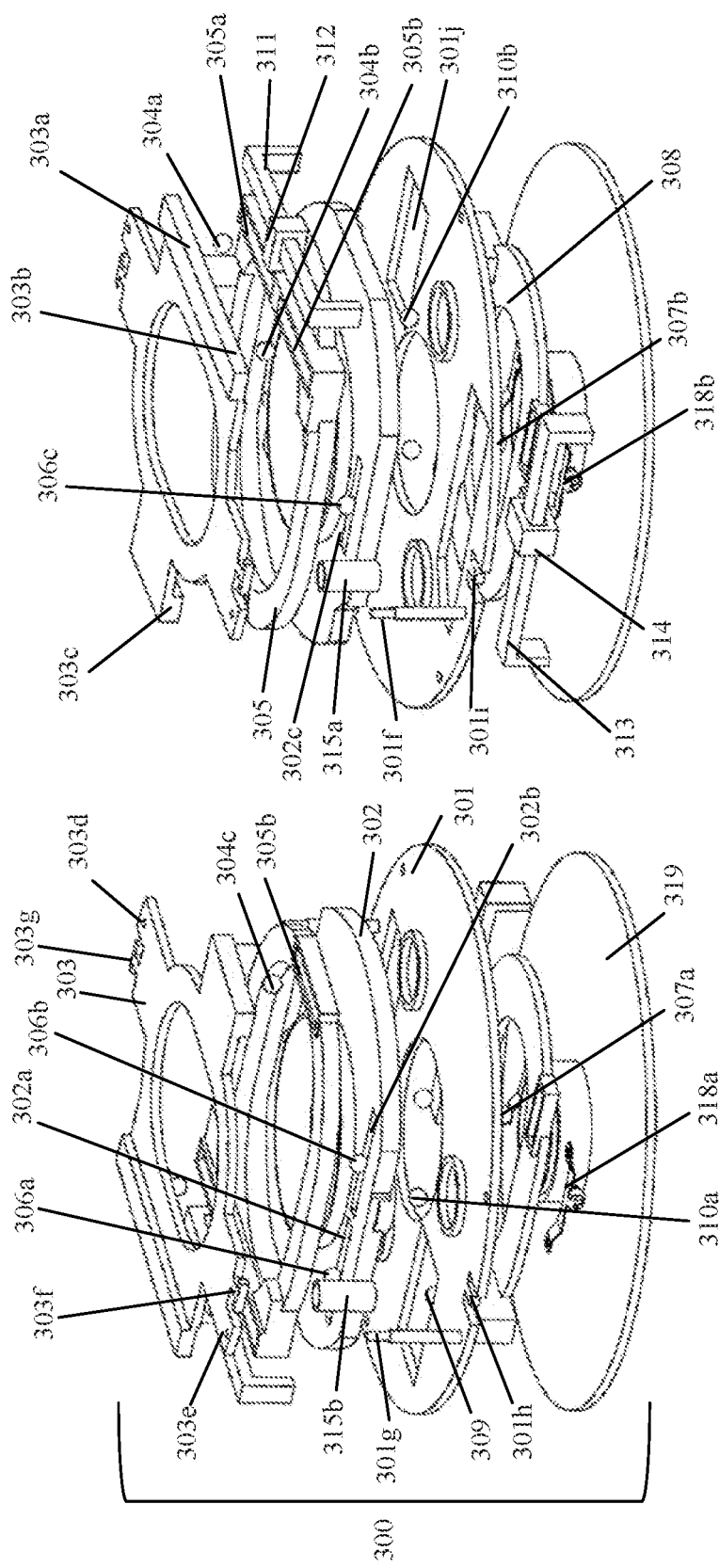
FIG. 6 is an exploded perspective view of a shift unit according to a second embodiment.
Figure 7:
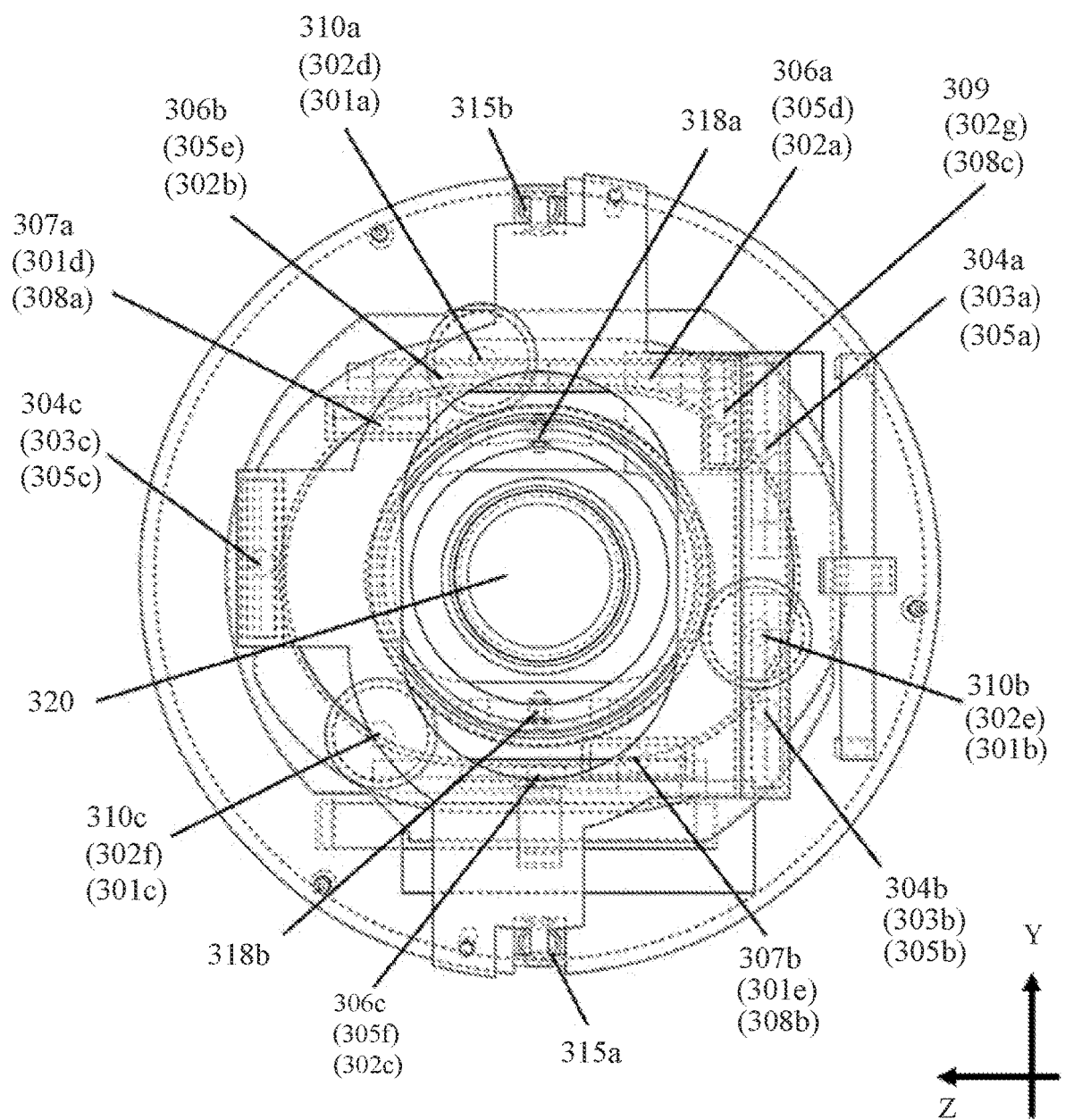
FIG. 7 is a perspective view of the shift unit according to the second embodiment viewed from the optical axis direction.

FIG. 6 is an exploded perspective view of a shift unit 300 according to this embodiment. FIG. 7 is a perspective view of the shift unit 300 according to this embodiment viewed from the X-axis direction.

The shift unit 300 includes a base 301, a shift barrel 302, a biasing member 303, a first movable member 305, and a second movable member 308. The shift barrel 302 holds a lens 320 (first optical member). Each of the biasing member 303, the first movable member 305, and the second movable member 308 has an annular shape when viewed from the X-axis direction.

The first movable member 305 is movable relative to the base 301 in the Y-axis direction and is movable relative to the shift barrel 302 in the Z-axis direction. The first movable member 305 restrains the shift barrel 302 from rotating about the optical axis O. The second movable member 308 is movable relative to the base 301 in the Z-axis direction and is movable relative to the shift barrel 302 in the Y-axis direction. The first movable member 305 and the second movable member 308 are configured so as not to contact each other during moving.

The biasing member 303 is guided in the X-axis direction by positioning pins 301f and 301g provided to the base 301 and positioning holes 303d and 303e provided in the biasing member 303. Tension springs 315a and 315b (first biasing units) are respectively hooked on spring hooks 301h and 301i of the base 301 and spring hooks 303f and 303g of the biasing member 303 and generate biasing forces.

Roller springs 318a and 318b (second biasing units) bias a fixed member 319 fixed to the base 301 by a screw. A rotating direction of a roller of each roller spring is the Z-axis direction.

A magnet 311 is fixed to the base 301, and a coil 312 is movable relative to the magnet 311 in the Y-axis direction. In this embodiment, the magnet 311 and the coil 312 constitute a first driving unit. A magnet 313 is fixed to the base 301 and a coil 314 is movable relative to the magnet 313 in the Z-axis direction. In this embodiment, the magnet 313 and the coil 314 constitute the first driving unit.

An unillustrated first scale and an unillustrated second scale are fixed to the first movable member 305 and the second movable member 308, respectively, and have scale patterns. An unillustrated optical sensor is fixed to the base 101 at a position facing each scale, and detects the position of the shift barrel 302 in the Y-axis direction and the position in the Z-axis direction by reading reflected light reflected on each scale pattern. Thereby, the position of the shift barrel 302 on a plane orthogonal to the optical axis O can be detected.

The coils 312 and 314 and optical sensors are connected to the lens-side CPU 9 by unillustrated flexible printed circuits, and a driving amount of each coil can be controlled according to the detection result of each optical sensor.

The biasing member 303 biases the first movable member 305 via balls 304a, 304b, and 304c. The ball 304a is held by a ball receiving portion 303a of the biasing member 303 and a ball receiving portion 305a of the first movable member 305. The ball 304b is held by a ball receiving portion 303b of the biasing member 303 and a ball receiving portion 305b of the first movable member 305. The ball 304c is held by a ball receiving portion 303c of the biasing member 303 and a ball receiving portion 305c of the first movable member 305.

The ball receiving portions 303a, 303b, 303c, 305a, and 305b extend in the Y-axis direction and have shapes illustrated in FIG. 3A when viewed from the Y-axis direction. The ball receiving portion 305c extends in the Y-axis direction and has a shape illustrated in FIG. 3B when viewed from the Y-axis direction. The ball receiving portions 303a and 303b and the ball receiving portions 305a and 305b are spaced apart in the Y-axis direction. Therefore, the balls 304a and 304b (first rolling members) and the ball receiving portions 303a, 303b, 305a, and 305b constitute a guide unit (first guide unit) that guides the movement of the first movable member 305 in the Y-axis direction.

The first movable member 305 is biased against the shift barrel 302 via balls 306a, 306b, and 306c. The ball 306a is held by a ball receiving portion 305d of the first movable member 305 and a ball receiving portion 302a of the shift barrel 302. The ball 306b is held by a ball receiving portion 305e of first movable member 305 and a ball receiving portion 302b of the shift barrel 302. The ball 306c is held by a ball receiving portion 305f of the first movable member 305 and a ball receiving portion 302c of the shift barrel 302.

The ball receiving portions 302a, 302b, 305d, 305e, and 305f extend in the Z-axis direction and have shapes illustrated in FIG. 3A when viewed from the Z-axis direction. The ball receiving portion 302c extends in the Z-axis direction and has a shape illustrated in FIG. 3B when viewed from the Z-axis direction. The ball receiving portions 302a and 302b and the ball receiving portions 305d and 305e are spaced apart in the Z-axis direction. Therefore, the balls 306a and 306b (second rolling members) and the ball receiving portions 302a, 302b, 305d, and 305e constitute a guide unit (second guide unit) that guides the movement of the first movable member 305 in the Z-axis direction.

The shift barrel 302 is biased against the base 301 via balls 310a, 310b, and 310c. The ball 310a is held by a ball receiving portion 301a of the base 301 and a ball receiving portion 302d of the shift barrel 302. The ball 310b is held by a ball receiving portion 301b of the base 301 and a ball receiving portion 302e of the shift barrel 302. The ball 310c is held by a ball receiving portion 301c of the base 301 and a ball receiving portion 302f of the shift barrel 302. Each ball receiving portion has a circular shape when viewed from the X-axis direction.

The second movable member 308 is biased against the base 301 via balls 307a and 307b. The second movable member 308 is biased against the shift barrel 302 via a ball 309 (fourth rolling member). The ball 307a is held by a ball receiving portion 308a of the second movable member 308 and a ball receiving portion 301d of the base 301. The ball 307b is held by a ball receiving portion 308b of the second movable member 308 and a ball receiving portion 301e of the base 301. The ball 309 passes through a hole 301j provided in the base 301 and is held by a ball receiving portion 308c of the second movable member 308 and a ball receiving portion 302g of the shift barrel 302.

The ball receiving portions 301d, 301e, 308a, and 308b extend in the Z-axis direction and have a shape illustrated in FIG. 3A when viewed from the Z-axis direction. The ball receiving portions 301d and 301e and the ball receiving portions 308a and 308b are spaced apart in the Z-axis direction. The ball receiving portions 301d, 301e, 308a, and 308b constitute a guide in the Z-axis direction between the base 301 and the second movable member 308. The balls 307a and 307b (third rolling members) and the ball receiving portions 301d, 301e, 308a and 308b constitute a guide unit (third guide units) that guides the movement of the second movable member 308 in the Z-axis direction.

The ball receiving portions 302g and 308c extend in the Y-axis direction and have shapes illustrated in FIG. 3A when viewed from the Y-axis direction. In a case where the second movable member 308 moves in the Z-axis direction, the shift barrel 302 moves following the second movable member 308. In a case where the shift barrel 302 moves in the Y-axis direction, the second movable member 308 does not move.

Since the base 301 can hold the shift barrel 302 via the balls, this embodiment can suppress tilt fluctuation.

When viewed from the X-axis direction, a midpoint of the tension springs 315a and 315b is located within a triangle formed by connecting the balls 304a, 304b, and 304c. When viewed from the X-axis direction, the gravity center of the triangle formed by connecting the balls 304a, 304b, and 304c is located within a triangle formed by connecting the balls 306a, 306b, and 306c. When viewed from the X-axis direction, the gravity center of the triangle formed by connecting the balls 306a, 306b, and 306c is located within a triangle formed by connecting the balls 310a, 310b, and 310c. Thereby, the biasing forces of the tension springs 315a and 315b are distributed to the balls 310a, 310b, and 310c while the shift barrel 302, the biasing member 303, and the first movable member 305 are prevented from floating.

More specifically, each ball between the biasing member 303 and the shift barrel 302 is disposed along a corresponding guide axis. The ball 310a is disposed on an axis rotated by approximately 45 degrees from the Y-axis or the Z-axis with the optical axis O as the center, and the balls 310b and 310c are disposed approximately equally from the ball 310a in the circumferential direction.

A midpoint of the roller springs 318a and 318b is located within a triangle formed by connecting the balls 307a, 307b, and 309. Thereby, the biasing forces transmitted from the roller springs 318a and 318b are distributed to the balls 307a, 307b, and 309 while the second movable member 308 is prevented from floating.

More specifically, the ball 309 is disposed on the opposite side of the ball 310c with respect to the optical axis O. The biasing force that the ball 309 applies to the shift barrel 302 acts in the opposite direction to the biasing force that the shift barrel 302 applies to the base 301. Thereby, the biasing force applied by the ball 309 to the shift barrel 302 is distributed to the balls 310a and 310b, and the biasing forces of the tension springs 315a and 315b can be efficiently transmitted to the base 301. The biasing force applied by the ball 309 to the shift barrel 302 is set so that the shift barrel 302 does not float from the base 301. The ball 307a is disposed on the opposite side of the ball 309 with respect to the optical axis O in the Z-axis direction, and the ball 307b is disposed on the opposite side of the ball 309 with respect to the optical axis O in the Y-axis direction.

As described above, the configuration according to the present embodiment can reduce the driving load and suppress tilt of the optical element unit even in a case where the driving amount of the optical element unit becomes large.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-078395, filed on May 11, 2022, which is hereby incorporated by reference herein in its entirety.

What is claimed is:

1. A driving apparatus comprising:
a base;
a shift barrel configured to hold a first optical member included in an optical system and held movably in a direction orthogonal to an optical axis direction parallel to an optical axis of the optical system;
a first guide unit including a first rolling member;
a second guide unit including a second rolling member;
a first movable member guided by the first guide unit so as to move in a first direction orthogonal to the optical axis direction relative to the base and guided by the second guide unit so as to move in a second direction orthogonal to the optical axis direction and the first direction relative to the shift barrel;
a first driving unit configured to drive the first movable member in the first direction;
a third guide unit including a third rolling member;
a second movable member guided by the third guide unit so as to move in the second direction relative to the base and biased against the shift barrel via a fourth rolling member;
a second driving unit configured to drive the second movable member in the second direction; and
a biasing member biased in the optical axis direction,
wherein the first guide unit and the third guide unit include different members.

2. The driving apparatus according to claim 1, wherein the first guide unit includes the biasing member, the first movable member, and the first rolling member, and
wherein the third guide unit includes the base, the second movable member, and the third rolling member.

3. The driving apparatus according to claim 1, wherein the shift barrel is held on the base,
wherein the first movable member and the second movable member are disposed between the shift barrel and the biasing member in the optical axis direction, and
wherein the biasing member is biased against the second movable member via a fifth rolling member.

4. The driving apparatus according to claim 3, wherein in a plane orthogonal to the optical axis direction, a midpoint of two first rolling members is located within a triangle formed by two second rolling members and a sixth rolling member configured to roll between the first movable member and the shift barrel.

5. The driving apparatus according to claim 4, where in the first direction, one of the two first rolling members is disposed on a first side with respect to the optical axis, and the other of the two first rolling members is disposed on a second side opposite to the first side with respect to the optical axis,
wherein the two second rolling members are disposed on the first side, and
wherein the sixth rolling member is disposed on the second side.

6. The driving apparatus according to claim 3, wherein in a plane orthogonal to the optical axis direction, the fifth rolling member is located within a triangle formed by two third rolling members and the fourth rolling member.

7. The driving apparatus according to claim 6, wherein the two third rolling members are disposed on both sides with respect to the optical axis in the first direction, and
wherein the fourth rolling member is more distant from the optical axis than the fifth rolling member in the second direction.

8. The driving apparatus according to claim 1, further comprising a biasing unit configured to bias the shift barrel, the first movable member, the second movable member, and the biasing member against the base.

9. The driving apparatus according to claim 8, wherein the biasing member is biased against the second movable member via a fifth rolling member, and
wherein on a plane orthogonal to the optical axis, a midpoint of the biasing unit is located within a triangle formed by two first rolling members and the fifth rolling member.

10. The driving apparatus according to claim 1, wherein one of the first movable member and the second movable member is disposed between the biasing member and the shift barrel, and
wherein the other of the first movable member and the second movable member is disposed between the shift barrel and the base.

11. The driving apparatus according to claim 1, further comprising:
a first biasing unit configured to bias the shift barrel and the first movable member against the base in a third direction parallel to the optical axis direction; and
a second biasing unit configured to bias the second movable member against the base in a fourth direction opposite to the third direction.

12. The driving apparatus according to claim 1, wherein the optical system includes a second optical member disposed adjacent to the first optical member in the optical axis direction and fixed in the direction orthogonal to the optical axis, and
wherein the driving apparatus further comprises:
a first side rolling member configured to hold the first movable member on a side of the first optical member, and disposed in the direction orthogonal to the optical axis with respect to the first optical member, and
a second side rolling member configured to hold the first movable member on a side of the second optical member, and disposed in the direction orthogonal to the optical axis direction with respect to the second optical member.

13. The driving apparatus according to claim 1, wherein each of the first driving unit and the second driving unit includes a stepping motor and a rack, and
wherein the rack is connected to the stepping motor in the optical axis direction.

14. The driving apparatus according to claim 1, further comprising:
a scale; and
an optical sensor configured to detect a position of the shift barrel using reflected light from the scale.

15. A lens apparatus comprising:
a driving apparatus; and
an optical system,
wherein the driving apparatus includes:
a base;
a shift barrel configured to hold a first optical member included in the optical system and held movably in a direction orthogonal to an optical axis direction parallel to an optical axis of the optical system;
a first guide unit including a first rolling member;
a second guide unit including a second rolling member;
a first movable member guided by the first guide unit so as to move in a first direction orthogonal to the optical axis direction relative to the base and guided by the second guide unit so as to move in a second direction orthogonal to the optical axis direction and the first direction relative to the shift barrel;
a first driving unit configured to drive the first movable member in the first direction;
a third guide unit including a third rolling member;
a second movable member guided by the third guide unit so as to move in the second direction relative to the base and biased against the shift barrel via a fourth rolling member;
a second driving unit configured to drive the second movable member in the second direction; and
a biasing member biased in the optical axis direction, and
wherein the first guide unit and the third guide unit include different members.

* * * * *